Dec. 10, 1940.  W. O. CHRISTIAN  2,224,668
CUTTING MACHINE
Filed Feb. 11, 1939  2 Sheets-Sheet 2
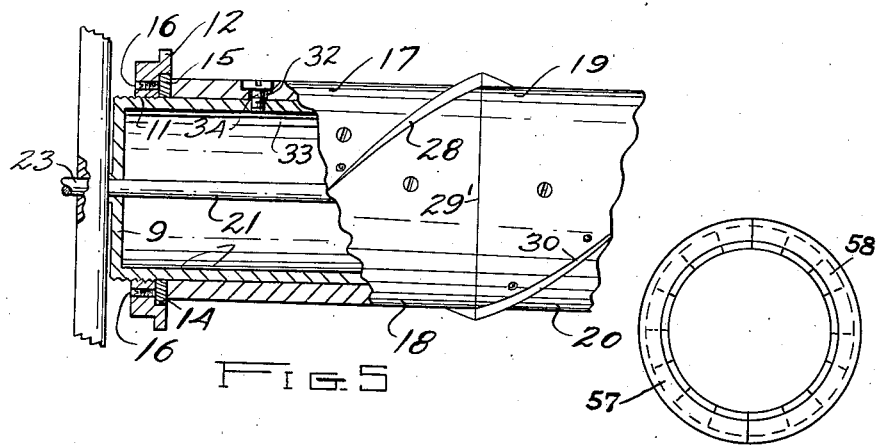
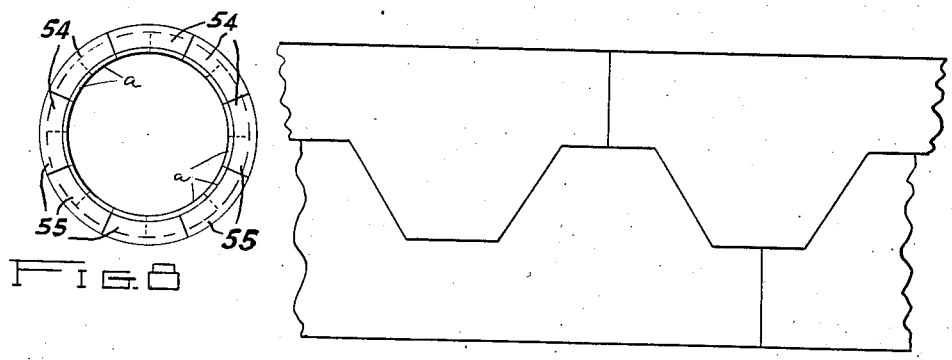
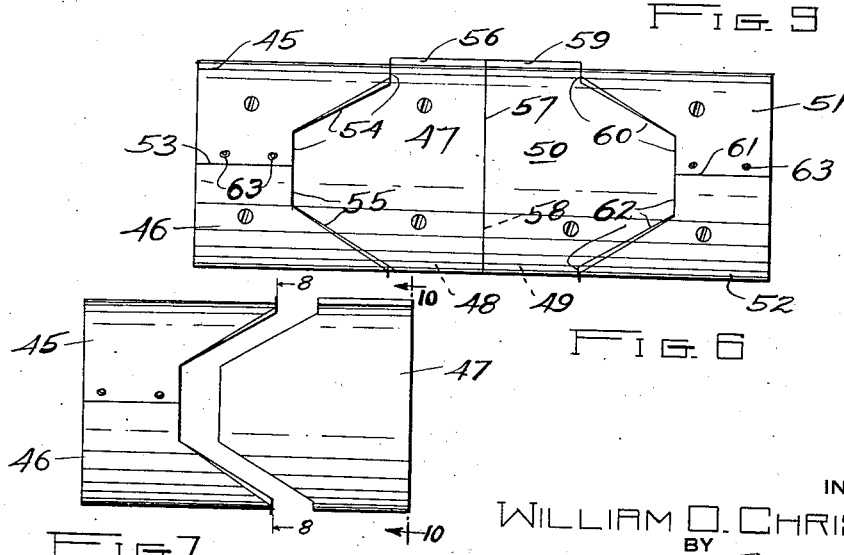
INVENTOR
WILLIAM O. CHRISTIAN
BY
Earl E. Moore
ATTORNEYS Patented Dec. 10, 1940

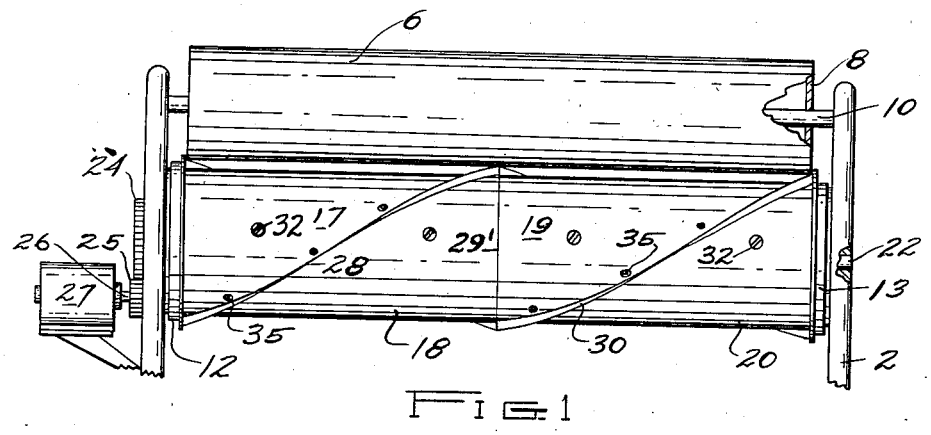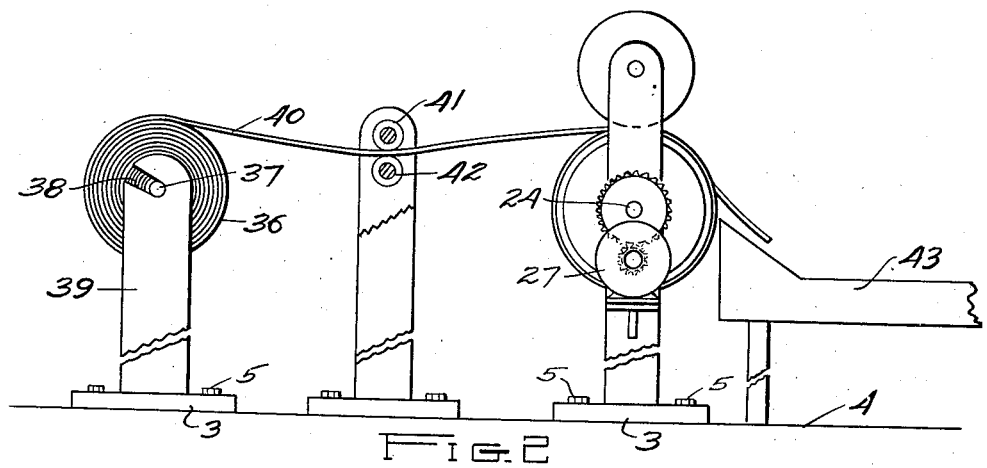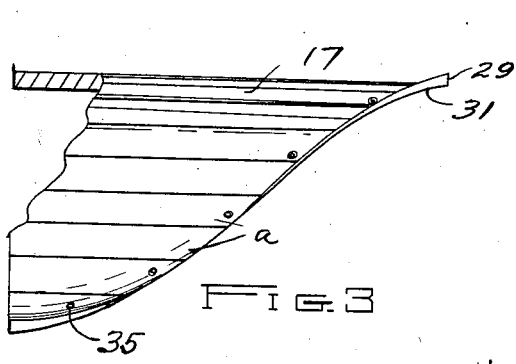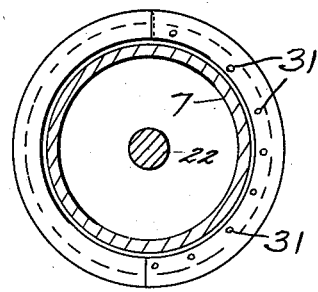

2,224,668

UNITED STATES PATENT OFFICE 2,224,668

CUTTING MACHINE

William O. Christian, Pasadena, Calif.

Application February 11, 1939, Serial No. 255,996

4 Claims. (Cl. 164—28)

This invention relates to a machine for cutting variously shaped pieces from flat roll material and has particular reference to the manufacture of shingles and the like. Asphalt roofing material is first made into long sheets which are coiled into rolls of suitable size. To form shingle strips, the rolls are unwound and cut by rotating knives into the size and shape required. Heretofore, large and cumbersome machines, involving a sizable outlay of money, was required to provide machines which were efficient, dependable in operation, and capable of doing the work. Such large machines required a great deal of floor space and were very expensive to operate. One of the expensive items was the rotating cutters or the cylinders upon which the cutting knives were fixed.

This invention, however, has greatly reduced the former costs involved in that the parts are lighter in weight and the roller or cylinder, upon which the cutters are fixed, are made of inexpensive material without sacrificing long life and perfect cutting operation. Telescoping cylinders are employed wherein the inner cylinder is used as the main support for the outer ones in a manner that the outer ones which contain the cutting knives can be changed or removed from the inner cylinders without disturbing them. This allows the cutting cylinders to be easily changed in a very short time whenever a new design of shingle must be cut. Since the inner cylinder always remains in the same position and is adapted to receive the outer or cutting cylinders, there are no heavy and cumbersome parts to be handled. The outer cylinders are made into removable sectional parts, no part of which is a complete cylinder. The parts, when assembled, however, form a perfect cylinder.

An object of the invention is to present a cutting machine which is versatile and adapted to receive cutters for a great variety of patterns.

Another object is to provide a cutting machine in which the cutting means is formed into segments so as to facilitate their replacement when a new pattern is to be cut.

Another object is to provide a machine for cutting variously designed shingles from a roll of roofing material, means being incorporated in the machine for pressing a plurality of cutter segments into a compact unit for proper rotation in the machine.

Other objects, advantages and features of my invention will appear from the accompanying drawings, the subjoined detailed description, the preamble of these specifications and the appended claims.

Applicant is about to illustrate and describe one of the forms of his invention in order to teach one how to make, use and vend the same, but it is to be understood that the drawings and description thereof are not to limit the invention in any sense whatsoever, except as limited by the appended claims.

In the drawings:

Fig. 1 shows the invention in front elevation.

Fig. 2 shows a side elevation of the invention in combination with other parts to make a complete operative cutting machine.

Fig. 3 shows an elevation of one of the holding sectors.

Fig. 4 shows an elevation of an end of one of the sectors.

Fig. 5 shows a part of the invention, partly in section.

Fig. 6 shows an elevation of an alternative form of the invention.

Fig. 7 shows a pulled-apart view of the alternative form of the invention.

Fig. 8 shows a cross view taken substantially along the line 8—8 of Fig. 7.

Fig. 9 shows a plan view of the material cut by the machine involving the alternative form of the invention as shown in Fig. 8.

Fig. 10 is an end view of Fig. 7 taken on the line 10—10 thereof and looking in the direction of the arrows.

In the preferred form of the invention, spaced apart standards 1 and 2 are provided which have the usual flange bases 3 and which are rigidly fixed to the floor 4 as by bolts 5. Between the standards are mounted rollers 6 and 7 which are preferably hollow metallic drums closed by end walls 8 and 9 respectively. The roller 6 is merely an idler mounted upon an axle 10 which passes through and is fixed to its end walls 8. The axle ends are journalled near the top of the standards 1 and 2 in a conventional manner. The surface of the cylinder or roller 6 is machined to a true cylinder so that it will efficiently cooperate with the other cylinder 7 in a manner to be later explained.

The roller 7, better shown in Fig. 5, has the cylindrical surface of its ends threaded as indicated at 11 to receive the flange collars 12 and 13 which have their bores threaded so that they can be screwed upon the roller 7. A portion of the collar 12 is recessed as shown at 14 to receive a snugly fitting ring 15, the inner periphery thereof snugly fitting the outer periphery of the roller 7. Push screws 16 are provided at spaced apart threaded holes of the collar 12 and are designed to push the rings 15 toward the center of the roller 7 so as to press firmly together the sectors 17, 18, 19 and 20 which snugly surround the roller.

A shaft 21 passes through the roller 7 and its end walls 9 to which it is fixed. One end 22 thereof is journalled in the standard 2 and the other end 23 is journalled in the standard 1. The end 23 of the shaft is extended and has fixed thereto a cog wheel 24 which meshes with a pinion 25. The pinion is fixed to a shaft 26 which extends from the rotor of an electric motor 27. The motor 27 is provided with any suitable electric current and is of sufficient power to turn the rotor 7 at the speed required. An electric switch of any desired design is provided in the electric line to stop and start the motor.

The sleeve sectors 17, 18, 19 and 20 carry the cutters; the sector 17 carries the diagonal cutter 28 and a semi-circular cutter 29; the sector 18, the semi-circular cutter 29'; and the sector 19, the diagonal cutter 30. The sector 20 in this particular case does not carry any cutter, but is provided, however, as the complementary part necessary to form the complete sleeve or cylinder. The sectors are made up of a plurality of segmented slats a which are glued or dove-tailed together to form a rigid unit. Although these slats are preferably wood, other material may be substituted, such as various hard asphalt and cellulose compositions, or even metal, especially aluminum and its derivatives.

The cutters are mounted upon the edges of their respective sectors as clearly shown in Figs. 3 and 4 by any suitable means such as nails, screws and the like as indicated by the numeral 31. The exposed edges of the cutters are ground so as to provide the proper cutting edge to cut the particular material to be cut. Since the machine is designed principally for cutting roofing material such as made of asphalt, and other semi-flexible materials, the knives need not be at a razor edge. The knives are of a good grade steel in the form of thin strips which have enough stability to remain always in the alignment shown.

The sectors 17 to 20 inclusive are provided with a plurality of holes 32 which are positioned to agree with similar holes 33 in the roller 7. The holes 32 are reamed so as to permit the countersinking of the bolt 34 which passes therethrough, the bolt being provided with a nut so that the sectors are held to the surfaces of the roller 7. The hole 32, however, is slightly larger than the bolt which passes therethrough so as to allow the sectors to have axial play along the roller 7.

When all the sectors are placed upon the roller 7, they are bolted to the cylinder in their substantially correct positions, and then the collars 12 are screwed along the threaded ends 11 of the roller until the ring 15 is against the outer edges of the end sectors. The screws 16 are then screwed inwardly so as to force the rings tightly against the sectors and press them all snugly together so that the cutting edges of the knives 28 will be in proper position in accordance with the design to be cut. An end of the material to be cut is then fed by hand to the rollers to start it, after which the motor 27 is started. The cutting edges of the knives 28 freely ride upon the idler 6 so as to give a good clean cut when the material is passed between the rollers 6 and 7.

In order to prevent the material from sticking to the sectors, after being cut, and continuing around with the roller 7, a plurality of springs 35 are employed. These springs are preferably coiled and extend a short distance beyond the surface of the roller when not pressed by the material while being cut. Sufficient springs are provided behind the knives to assure that the material will not stick to the sectors.

In Fig. 2, sufficient equipment is shown for cutting roofing material which comes generally in rolls as indicated at 36. These rolls have inserted through the center thereof an axle 37 which protrudes beyond the ends of the roller and are received in slots 38 of a pair of standards 39. The material from the roll is indicated as by numeral 40, which passes between guide rollers 41 and 42 and through the cutting mechanism which is the principal part of this invention. The table 43 is provided at one side of the cutting mechanism to receive the material after being cut and for arranging same for removal and stacking.

The alternative form of the invention shown in Figs. 6 to 9 inclusive employs the same roller 7 as in the preferred form of the invention; the only difference is in the sectors which are provided with the knives. The knives are arranged for cutting a different pattern. This form embodies sectors 45 to 52 inclusive arranged about the roller as shown in Fig. 6. The sector 45 carries upon its edge the knives 53 and 54, the sector 46 carries the knives 55, sector 47 the knives 56 and the semi-circular one 57; the sector 48, diametrically opposite sector 47, carries the knife 58 which is a duplicate of 57; sector 49 carries no knives; the sector 50 carries the knife 59, sector 51 the knives 60 and 61, and the sector 52 the knife 62. The knives 60 and 62 extend around their respective sectors like the knives 54 and 55 shown in Fig. 8. When the material passes between the rollers 6 and 7, when the sectors 45–52 inclusive are employed, the material is cut as shown in Fig. 9.

Coil springs 63 are provided where desired upon the various sectors so as to assure that the material will automatically free itself from the sectors after being cut.

Having thus described my invention, what is claimed as new and desired to be secured by Letters Patent is:

1. In a machine for cutting material into a design, a plurality of rollers, sectors carrying knives removably fixed to one of the rollers, means at the ends of said one of the rollers for pressing the sectors tightly together along the roller, said means including an adjustable ring adapted to work from an end of said one of the rollers toward the other end thereof.

2. In a machine for cutting material into pieces, a roller and a cylinder, sectors removably fixed to the cylinder, knives extending from the sectors to said roller so as to cut the material when run between the roller and cylinder, means at an end of the cylinder for pressing the sectors tightly together for positioning the knives in their proper alinement, said means including a running thread on and at the end of the cylinder and rotary means threaded thereon to engage proximate sides of the sectors.

3. In a machine for cutting material into pieces, a roller and a cylinder, sectors removably fixed to the cylinder, knives extending from the sectors to said roller so as to cut the material when run between the roller and cylinder, means at the ends of the cylinder for pressing the sectors tightly together for positioning the knives in their proper alinement, said means including an adjustable collar having an annular recess, an adjustable ring in said recess, means in said collar for forcing the ring against the proximate sectors.

4. In an apparatus for cutting sheet material, a cylinder having ends, means removably attached to the cylinder and spaced from the ends thereof, said means supporting knives, means at the end of the cylinder adjustable along its surface toward the opposite end thereof and adapted to abut proximate ends of said first recited means, said second recited means comprising a collar having an annular groove, a ring in said groove, means for adjusting the ring with respect to said collar.

WILLIAM O. CHRISTIAN.